United States Patent
Chiriac et al.

(10) Patent No.: US 10,385,416 B2
(45) Date of Patent: Aug. 20, 2019

(54) RAPID LOCAL ANNEALING OF HIGH STRENGTH STEEL

(71) Applicant: Ford Global Technologies, LLC, Dearborn, MI (US)

(72) Inventors: Constantin Chiriac, Windsor (CA); Garret Sankey Huff, Ann Arbor, MI (US); Raj Sohmshetty, Canton, MI (US); Peter A. Friedman, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 15/465,116

(22) Filed: Mar. 21, 2017

(65) Prior Publication Data

US 2018/0274052 A1  Sep. 27, 2018

(51) Int. Cl.
| | | |
|---|---|---|
| *C21D 9/00* | (2006.01) | |
| *C21D 6/00* | (2006.01) | |
| *C22C 38/54* | (2006.01) | |
| *C22C 38/50* | (2006.01) | |
| *C22C 38/46* | (2006.01) | |
| *C22C 38/06* | (2006.01) | |
| *C22C 38/04* | (2006.01) | |
| *C22C 38/02* | (2006.01) | |
| *C22C 38/00* | (2006.01) | |
| *F16B 19/08* | (2006.01) | |

(52) U.S. Cl.
CPC .......... *C21D 9/0068* (2013.01); *C21D 6/004* (2013.01); *C21D 6/005* (2013.01); *C21D 6/008* (2013.01); *C22C 38/002* (2013.01); *C22C 38/02* (2013.01); *C22C 38/04* (2013.01); *C22C 38/06* (2013.01); *C22C 38/46* (2013.01); *C22C 38/50* (2013.01); *C22C 38/54* (2013.01); *F16B 19/086* (2013.01); *C21D 2211/008* (2013.01)

(58) Field of Classification Search
CPC .. C21D 2211/008; C21D 6/004; C21D 6/005; C21D 6/008; C21D 9/0068; C22C 38/002; C22C 38/02; C22C 38/04; C22C 38/06; C22C 38/46; C22C 38/50; C22C 38/54; F16B 19/086
See application file for complete search history.

(56) References Cited

FOREIGN PATENT DOCUMENTS

DE  102013011572 A1  1/2015

OTHER PUBLICATIONS

Hikita, K. et al., "Effects of Initial Microstructure of Boron Steel Sheets on Hardenability and Mechanical Property after Hardening", Internet Description http://www.asminternational.org/web/edfas/search/, Oct. 7, 2016, 2 pgs.
Gunnarsdottir, S. A. et al., "Geometry Effects of Laser Tempering in Boron Steel Before Self-Pierce Riveting", 2015, 83 pgs.
Meschut, G. et al.,"Hybrid technologies for joining ultra-high-strength boron steels with aluminum alloys for lightweight car body structures", Elsevier, 2014, 5 pgs.
Meschut, G. et al., "Innovative and Highly Productive Joining Technologies for Multi-Material Lightweight Car Body Structures", Apr. 8, 2014, 9 pgs.
Vogt, S. D. et al., "Local Laser Heat Treatment of Hot Stamped Steel", Sep. 2014, 1 pg.

*Primary Examiner* — Jenny R Wu
(74) *Attorney, Agent, or Firm* — Raymond L. Coppiellie; Brooks Kushman P.C.

(57) ABSTRACT

Systems and methods for locally softening high strength steel are disclosed. One method may include heat treating one or more local regions of a steel component having a hardness of at least 450 HV to soften the local region(s) to a hardness of at most 250 HV. The heat treating may include heating only the local region(s) to a target temperature above an $A_{C1}$ temperature of the component and below an $A_{C3}$ temperature of the component. In another method, the heat treating may include heating only the local region(s) to a first target temperature above an $A_{C3}$ temperature of the component, cooling the local region(s) to below an $A_{C1}$ temperature of the component, and isothermally holding the local region(s) at a second target temperature below the $A_{C1}$ temperature. The locally softened region(s) may allow for improved joining and/or trimming of the component.

7 Claims, 5 Drawing Sheets

RAPID LOCAL ANNEALING OF HIGH STRENGTH STEEL

TECHNICAL FIELD

The present disclosure relates to rapid local annealing of high strength steel, for example, to enable joining or trimming.

BACKGROUND

In order to meet fuel efficiency standards and/or customer fuel economy expectations, efforts have been made to reduce the weight of vehicles (e.g., light-weighting). One approach to light-weighting has included substituting lighter materials for traditional materials, for example, using aluminum instead of steel for some components. Additionally, stronger grades of steel reduce vehicle mass by enabling more efficient designs requiring less steel. These substitutions and strategies may also be mixed, leading to situations where dissimilar materials need to be joined. However, difficulties in joining the dissimilar materials may limit the utilization of lighter weight materials. For example, there may be difficulties in the welding and joining processes when components formed of aluminum and high strength steel need to be joined.

One current solution for mechanical joining of dissimilar materials is the use of self-piercing rivets (SPRs). In general, the SPR process includes clamping two or more sheets between a die and a blankholder and driving a semi-tubular rivet into the materials between a punch and die in a press tool. The SPR pierces the top sheet and flares into the lower sheet to mechanically interlock the sheets. Riveting aluminum alloys with advanced high-strength steel (AHSS) or ultra high-strength steel (DHSS), such as boron steel, can be challenging due to high strength/low ductility of the AHSS or boron steel after hot stamping.

SUMMARY

In at least one embodiment, a method is provided. The method may include heat treating one or more local regions of a steel component having a hardness of at least 450 HV to soften the local region(s) to a hardness of at most 250 HV. The heat treating may include heating only the local region(s) to a target temperature above an $A_{C1}$ temperature of the component and below an $A_{C3}$ temperature of the component.

Heating only the local region(s) to the target temperature may include continuously increasing a temperature of the local region(s) until they reach the target temperature. Once the local region(s) reach the target temperature, heating may be stopped and a cooling step may be started that includes cooling the local region(s) at a rate of at most 10° C./s. The cooling step may include air cooling the local region(s). The local region(s) may be heated to the target temperature in less than 10 seconds. In one embodiment, the steel component is a boron steel component including non-tempered martensite. In another embodiment the $A_{C1}$ temperature of the boron steel component may be determined according to the equation: $A_{C1}=755-10.7(\% \text{ Mn})+16.9(\% \text{ Cr})+29.1(\% \text{ Si})+0.035 \text{ HR(mart)}$; wherein HR(mart) represents a heating rate of the non-tempered martensite. The heating rate may be at least 100° C./s. The method may further include inserting a mechanical fastener into the local region(s) to join the component to a second component or trimming the component in the local region(s).

In at least one embodiment, a method is provided. The method may include heat treating one or more local regions of a steel component having a hardness of at least 450 HV to soften the local region(s). The heat treating may include heating only the local region(s) to a first target temperature above an $A_{C3}$ temperature of the component, cooling the local region(s) to below an $A_{C1}$ temperature of the component, and isothermally holding the local region(s) at a second target temperature below the $A_{C1}$ temperature.

The method may further include cooling the local region(s) after the isothermal hold such that the local region(s) have a hardness of at most 250 HV. In one embodiment, the second target temperature is within 20% of the $A_{C1}$ temperature. The isothermal hold may be for up to 20 seconds. In one embodiment, the isothermal hold may include holding a temperature of the local region(s) substantially constant at the second target temperature. In another embodiment, the isothermal hold includes holding a temperature of the local region(s) within a window around the second target temperature, the window being up to 10° C. Heating only the local region(s) to the first target temperature may include continuously increasing a temperature of the local region(s) until they reach the first target temperature and, once the local region(s) reach the target temperature, heating may be discontinued and the cooling to below the $A_{C1}$ temperature may be started.

In one embodiment, the steel component is a boron steel component including non-tempered martensite; and the $A_{C1}$ and $A_{C3}$ temperatures are determined according to the following equations: $A_{C1}=755-10.7(\% \text{ Mn})+16.9(\% \text{ Cr})+29.1(\% \text{ Si})+0.035 \text{ HR(mart)}$; $A_{C3}=923-203(\% \text{ C})^{1/2}-30(\% \text{ Mn})+31.5(\% \text{ Mo})-11(\% \text{ Cr})+44.7(\% \text{ Si})+0.034 \text{ HR(mart)}$, wherein HR(mart) represents a heating rate of the non-tempered martensite. The method may further include inserting a mechanical fastener into the local region(s) to join the component to a second component or trimming the component in the local region(s).

In at least one embodiment, an assembly is provided. The assembly may include a first component of steel and having a bulk hardness of at least 450 HV and one or more local regions having a hardness of at most 250 HV; a second component of a different material than the first component; and a fastener joining the first and second components and extending within one of the one or more local regions. In one embodiment, the one or more local regions may have a hardness of at most 200 HV.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

To join dissimilar materials that cannot be joined using traditional techniques, new fastening methods have been developed. One approach that has gained popularity is self-piercing rivets (SPRs), however, there are a variety of other approaches, such as friction element welding (FEW) and flow drill screw (FDS). As described above, joining dissimilar materials using these alternate techniques may pose a challenge when one of the materials has high strength and relatively low ductility. In addition to challenges in joining high-strengths steels, it is also difficult to trim components formed of high-strength steel after stamping them (or perform other machining processes on them).

Figure 1:
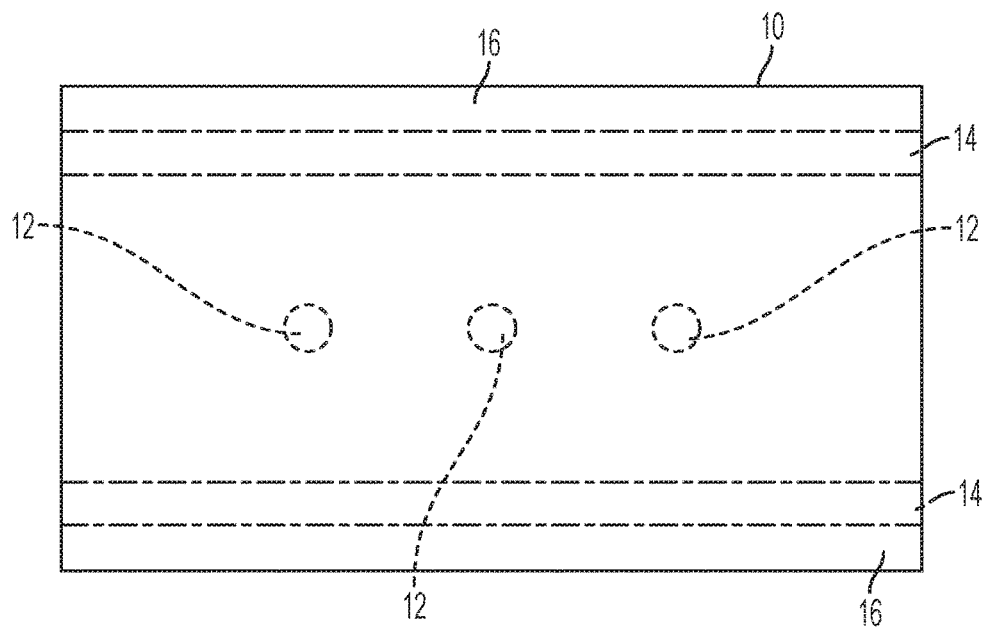
FIG. 1 is a schematic top plan view of a hot stamped component including regions to be joined and trimmed that will receive a local softening operation, according to an embodiment.

With reference to FIG. 1, a component 10 is shown. The component 10 may be a hot-stamped component. In one embodiment, the component 10 is formed of steel, such as an advanced high-strength steel (AHSS) or ultra high-strength steel (DHSS), such as boron steel. When hot stamped, the component may have a mostly or completely martensitic microstructure (e.g., at least 90, 95, or 99 vol. %). The hot-stamped component may have a very high hardness, such as at least 450 HV or 475 HV. The component 10 may include one or more regions that are configured to have additional processing steps performed thereon, such as a joining process or a trimming process.

In one embodiment, the component 10 may include one or more joining regions 12 that are configured to receive a mechanical fastener. The mechanical fastener may be a type that does not require or use a pre-formed hole, such as an SPR, FEW, FDS, or other mechanical fastener. Three joining regions 12 are shown in dotted/dashed lines in FIG. 1, however, there may be a single joining region 12 or any number of joining regions 12. The joining region(s) 12 may be located anywhere on the component 10 that is configured to receive a fastener.

In addition to, or instead of, joining region(s) 12, the component may include trimming region(s) 14. The trimming regions 14 may be regions of the component 10 that are configured to be machined or cut. The trimming regions 14 may be formed as strips or bands having a relatively narrow width to allow for a trimming tool to pass there through. The trimming tool may be mechanical (e.g., a cutting or milling tool, such as a saw) or non-mechanical (e.g., water jet, laser, etc.), and the width of the trimming region 14 may vary depending on the type of trimming tool used. Two trimming regions 14 are shown, however, there may be a single trimming region 14 or any number of trimming regions 14. The trimming regions 14 may define scrap regions 16, or regions of the component that are to be removed by the trimming operation(s).

In at least one embodiment, a local softening operation may be performed on the high-strength steel in areas or regions that are to be joined, trimmed, or otherwise machined (e.g., regions 12 and/or 14). In general, high-strength steels, for example, those formed by hot stamping, have a microstructure that is mostly or completely martensitic. Hot stamping of steel generally includes heating a component to a temperature at which the microstructure is fully austenite and then quenching it to form martensite using cooled dies during a stamping operation. Martensite is a microstructure that occurs due to a diffusionless transformation from austenite that occurs when a steel component is rapidly cooled. The martensite microstructure includes lath- or plate-shaped crystal grains and results in very high strength compared to other phases/microstructures. To locally soften certain areas/regions of the steel, those regions may be annealed to change their microstructure to include different, softer phases, such as ferrite and/or perlite microconstituents. However, the typical annealing cycle time of steel to obtain these micro-constituents (e.g., ferrite and perlite) is more than four hours long.

In order to decrease the annealing cycle time to obtain annealed microstructure in the riveting area, two rapid annealing methods were developed to produce annealed microstructures for AHSS or DHSS (e.g., boron steel) after hot stamping. The time required for the proposed methods may range from a few seconds to less than 50 seconds. The disclosed annealing methods may reduce the hardness of the hot-stamped steel from above 400 HV (e.g., above 450 HV or 475 HV) to less than 250 HV (e.g., less than 225 HV or 200 HV). The annealed portions of the steel may then be joined (e.g., using an SPR), trimmed, or otherwise machined.

Figure 2:
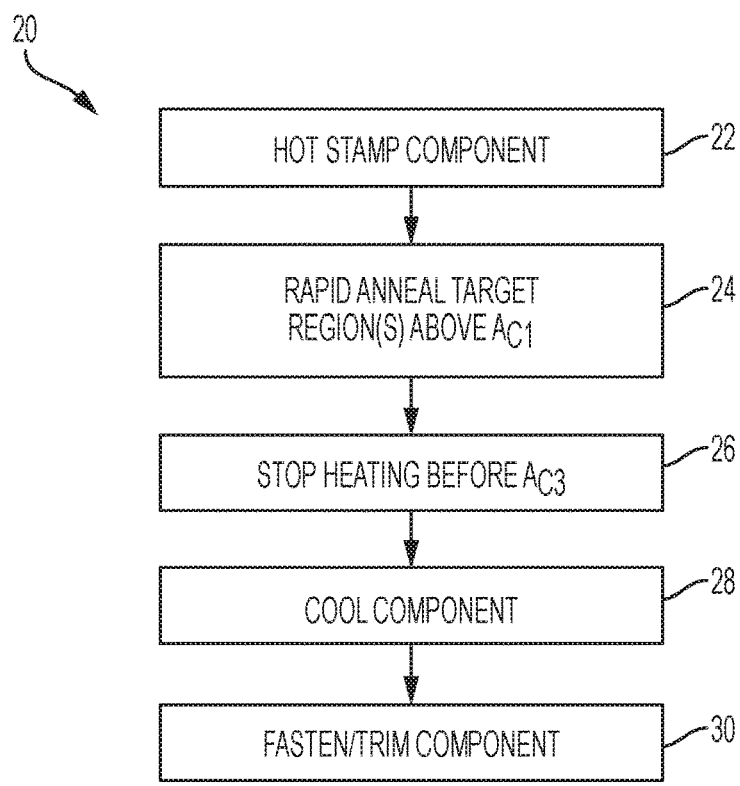
FIG. 2 is an example of a flowchart for a method of locally softening regions of a component to be joined or trimmed using a rapid inter-critical annealing process, according to an embodiment.
Figure 3:
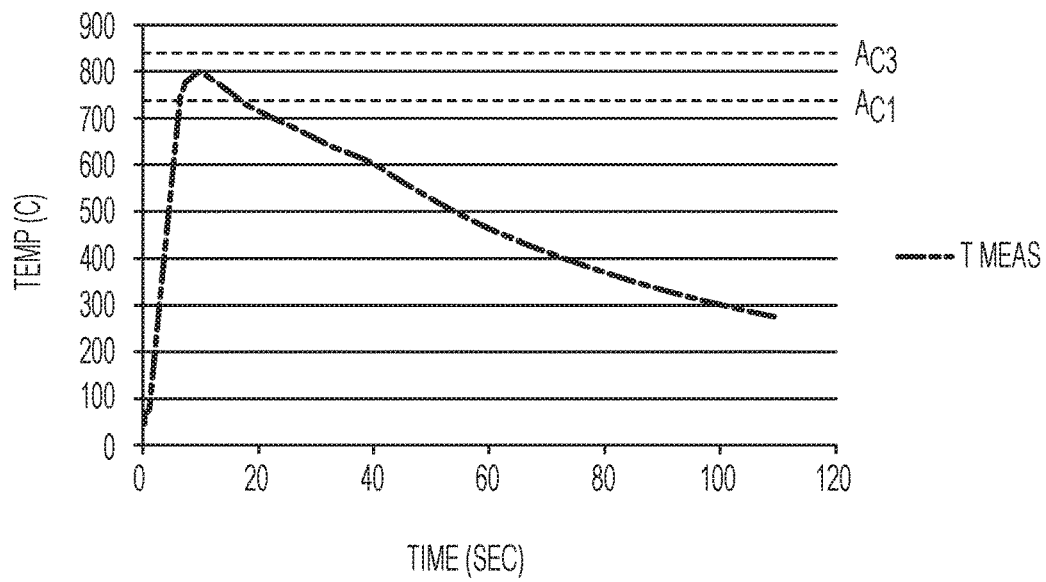
FIG. 3 is a plot of temperature vs. time for a local region of a component during a rapid inter-critical annealing process, according to an embodiment.

With reference to FIGS. 2-3, an example of a disclosed rapid inter-critical annealing process 20 is shown, as well as an example heating profile for the process 20. In step 22, a component (e.g., steel component) may be hot stamped. While hot stamping is shown and described, step 22 may include other heating and quenching processes. The result of step 22 may be a steel component that has a microstructure that is mostly or completely martensitic. The steel component may be an AHSS or DHSS, such as boron steel. However, the process 20 may be applicable to any steel composition.

In step 24, certain target regions of the component may be rapidly heated. The target regions may be regions that are to be joined/fastened, trimmed, or otherwise machined. For example, the regions may include joining region(s) 12 and/or trimming region(s) 14, as described above. The rapid heating may be performed using any suitable heating equipment capable or high heating rates (e.g., 100° C./s or higher). In one embodiment, the heating rate may be at least 100° C./s, for example, at least 150° C./s, 200° C./s, or 300° C./s. Non-limiting examples of heating equipment that may be used may include induction heating or laser heating.

In one embodiment, during step 24, the region(s) of the component may be heated to a temperature below the $A_{C1}$ temperature if the component is to be trimmed, or above the $A_{C1}$ temperature if the component is to be joined/fastened. In another embodiment, the region(s) of the component may be heated to a temperature above the $A_{C1}$ temperature for both trimming and joining/fastening. The region(s) of the component may be heated above the $A_{C1}$ temperature but to a temperature below the $A_{C3}$ temperature. The $A_{C1}$ temperature may be defined as the temperature at which austenite begins to form during heating. The $A_{C3}$ temperature may be defined as the temperature at which the transformation to austenite is complete. If the component was quenched to form martensite in step 22 and was not tempered, then the microstructure may begin to change from non-tempered martensite to austenite at the $A_{C1}$ temperature. Depending on the particular heat treatment and quench in step 22, the microstructure of the component may also include small amounts of ferrite and/or pearlite. The rapid heating in step 24 may raise the temperature of the targeted regions of the component to above the component's $A_{C1}$ temperature. This rapid heating may occur in a very short time period, for example, in less than 10 seconds. In one embodiment, the heating step may take less than 20 seconds. In another embodiment, the heating step may take less than 15 seconds or less than 6 seconds. For example, the heating step may take from 1 to 30 seconds, or any sub-range therein, such as 1 to 20 seconds, 1 to 15 seconds, 5 to 20 seconds, or 3 to 5 seconds.

As described in further detail below, the $A_{C1}$ temperature and the $A_{C3}$ temperature may depend on a variety of factors, such as the incoming microstructure (prior to heating), the chemical composition, and the heating rate. Accordingly, the $A_{C1}$ temperature may not be an absolute number, but rather may depend on the component itself and the particular heat treatment being applied. In general, the $A_{C1}$ temperature may typically be above 700° C. and below 800° C. and the $A_{C3}$ temperature may typically be above 800° C. for an AHSS or DHSS. However, as described above, these ranges are not intended to be limiting and the chemical composition, microstructure, and/or heating rate may result in an $A_{C1}$ temperature or $A_{C3}$ temperature that is outside of these ranges for certain components and heat treatments.

In step 26, the rapid heat treatment of step 24 may be stopped or ceased at a temperature right below $A_{C1}$, or above the $A_{C1}$ temperature and below the $A_{C3}$ temperature of the component. The temperature between the $A_{C1}$ temperature and the $A_{C3}$ temperature may be referred to as the $A_{C1}$-$A_{C3}$ window. The portion of the temperature window $A_{C1}$-$A_{C3}$ where the heating is stopped may depend on the chemical composition of the steel component and/or the heating rate used in the process. For example, the heating may stop at the 20%, 30% or 50% mark in the $A_{C1}$-$A_{C3}$ window. In one embodiment, the heating may stop at a temperature that is at 10 to 60% of the $A_{C1}$-$A_{C3}$ window, or any sub-range therein, such as 20 to 50%, 20 to 40%, 30 to 50%, or 30 to 40%. For example, if the $A_{C1}$-$A_{C3}$ window has a size of 100° C., then a range of 20 to 50% may be from 20° C. to 50° C. above the $A_{C1}$ temperature.

If the heating is performed by induction heating, the current in the induction heating coil may be stopped. If the heating is performed by laser heating, the laser may be turned off. Accordingly, the heat treatment in step 24 may be abruptly stopped. In one embodiment, the heat treatment 24 may have no isothermal holding period. For example, the temperature of the component may be constantly increasing during the rapid heat treatment until the heat source is removed in step 26. In another embodiment, there may be a very short isothermal hold during the heat treatment 24, such as for 2 seconds or less or 1 second or less. The hold may occur just prior to removing the heat treatment in step 26.

In step 28, the component (or just the heated regions thereof) may be cooled after the heat source is removed. In one embodiment, the component may be cooled by ambient air when the heat source is removed, such that no additional equipment is necessary. This may provide a relatively slow cooling rate such that a mixture of ferrite and pearlite are formed in the regions of the component that were heated. Other cooling approaches may also be used, such as moving air (e.g., using fans) or liquid cooling (e.g., water, oil, etc.). When the rapid heating is to a temperature right below the $A_{C1}$ temperature, the cooling rate may not be restricted, as it may have little or no influence on the resulting hardness of the treated region. When heating is to a temperature between the $A_{C1}$ and $A_{C3}$ temperatures, the cooling rate may generally be relatively low such that the resulting hardness of the treated regions is low. For example, the cooling rate may be at most 5° C./s, 10° C./s, 15° C./s, 20° C./s, or air cooling rates. In one embodiment, the heat treated regions of the component may have a hardness of 250 HV or less after cooling, for example, 225 HV or less or 200 HV or less.

In step 30, the component may be joined or fastened to another component and/or portions of the component may be trimmed. Fasteners, such as SPR, FEW, FDS, or others may be inserted into the component in the heat treated regions (e.g., joining regions 12) having a reduced hardness compared to the bulk/rest of the component. As used herein, portions of the component that were not heat treated, and therefore remain mostly/completely martensite, may be referred to as the bulk of the component. If the component is to be trimmed, then a trimming operation may be performed along the heat-treated trimming regions (e.g., strips/bands). The trimming may be done using any suitable method, such as cutting or laser trimming.

With reference to FIG. 3, an example temperature plot of a rapid inter-critical annealing process is shown. This temperature plot is for a 22MnB5 steel—a high-strength boron steel composition well known to those in the art. This temperature plot may correspond to steps 24-28 of process 20. As shown, the heating of the targeted regions may be rapid, taking less than 8 seconds. The heat treatment raises the temperature of the region above a schematic $A_{C1}$ temperature and below a schematic $A_{C3}$ temperature, shown by labeled dotted lines. Once the target temperature is reached, the heating is stopped and the component was allowed to air cool. As shown, this resulted in a relatively slow cooling rate. The component had an initial hardness of 480 HV. After the rapid annealing process, the locally annealed region had a hardness of 200 HV. This significantly reduced hardness makes the locally annealed region suitable for joining and/or trimming operations.

Figure 4:
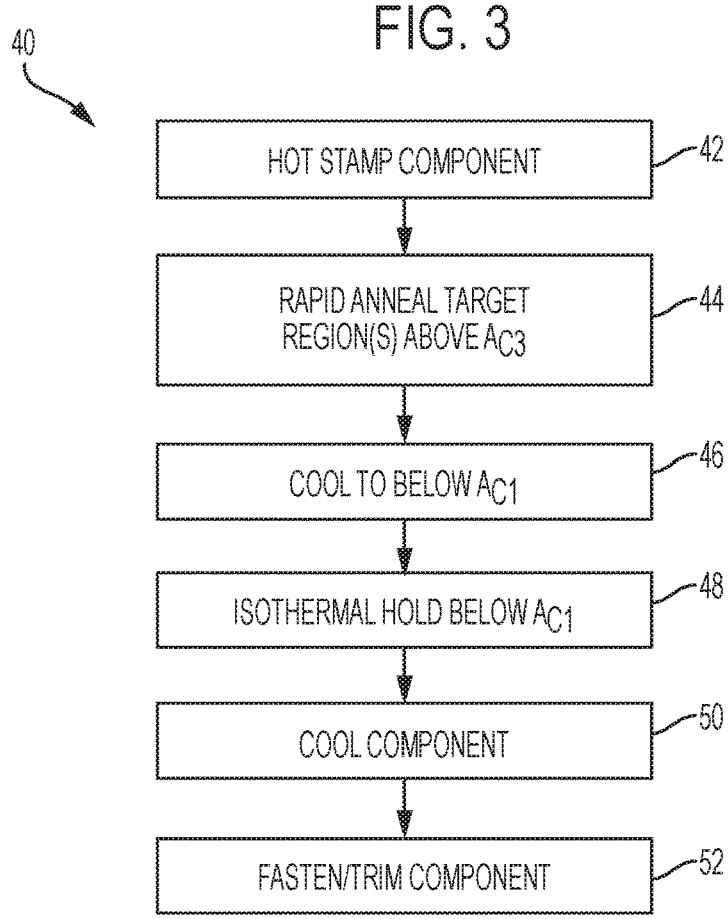
FIG. 4 is an example of a flowchart for a method of locally softening regions of a component to be joined or trimmed using a rapid isothermal annealing process, according to an embodiment.
Figure 5:
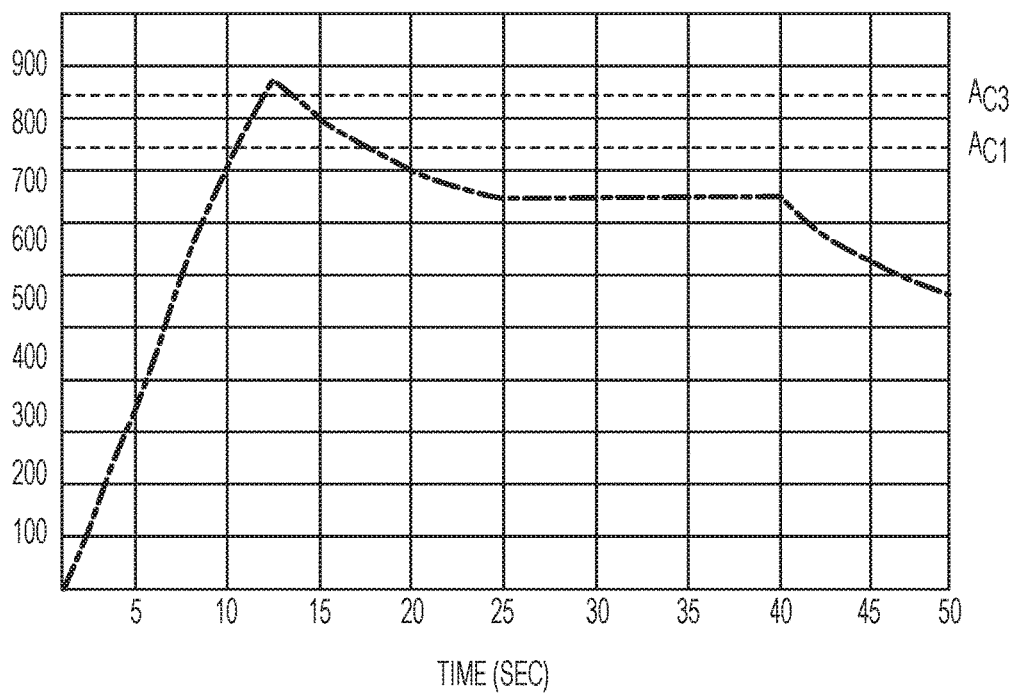
FIG. 5 is a plot of temperature vs. time for a local region of a component during a rapid isothermal annealing process, according to an embodiment.
Figure 6A:
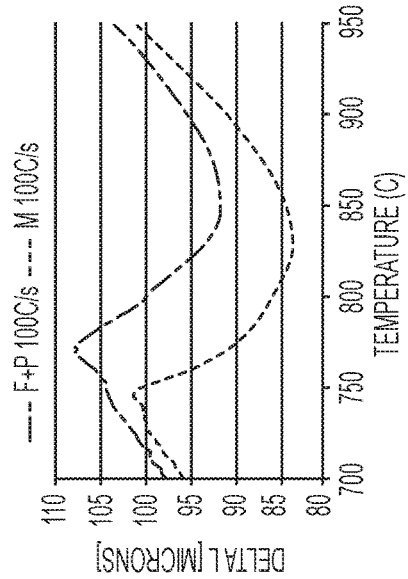
FIG. 6A shows dilatometry curves for a microstructure of ferrite+spheroidal carbides and non-tempered martensite at a 10° C./s heating rate.
Figure 6B:
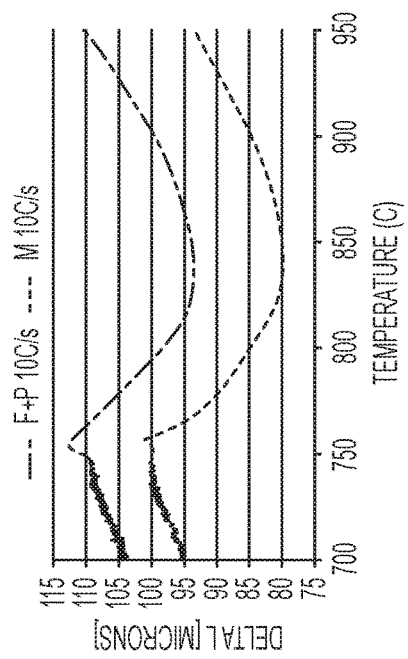
FIG. 6B shows dilatometry curves for a microstructure of ferrite+spheroidal carbides and non-tempered martensite at a 100° C./s heating rate.
Figure 6C:
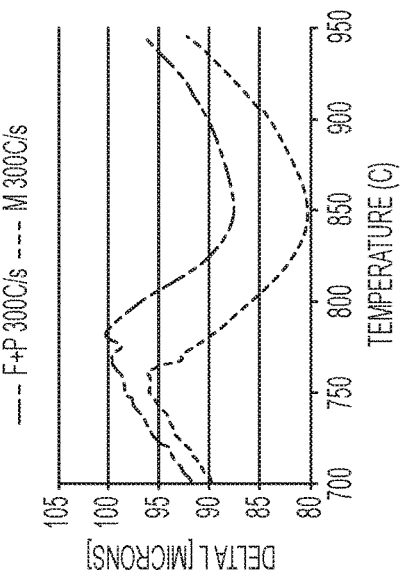
FIG. 6C shows dilatometry curves for a microstructure of ferrite+spheroidal carbides and non-tempered martensite at a 200° C./s heating rate.
Figure 6D:
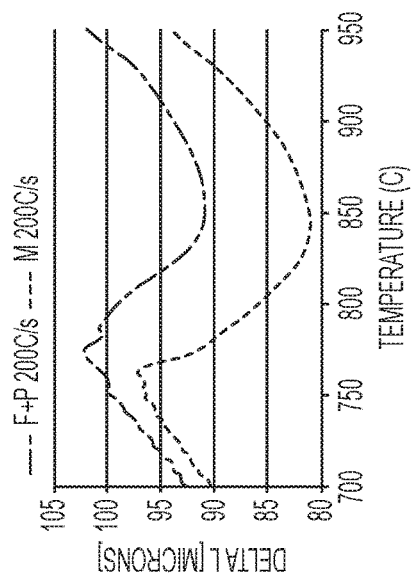
FIG. 6D shows dilatometry curves for a microstructure of ferrite+spheroidal carbides and non-tempered martensite at a 300° C./s heating rate.

With reference to FIGS. 4-5, an example of a disclosed rapid isothermal annealing process 40 is shown, as well as an example heating profile for the process 40. In step 42, a component (e.g., steel component) may be hot stamped. While hot stamping is shown and described, step 42 may include other heating and quenching processes. The result of step 42 may be a steel component that has a microstructure that is mostly or completely martensitic. The steel component may be an AHSS or DHSS, such as boron steel. However, the process 40 may be applicable to any steel composition.

In step 44, certain target regions of the component may be rapidly heated. The target regions may be regions that are to be joined/fastened, trimmed, or otherwise machined. For example, the regions may include joining region(s) 12 and/or trimming region(s) 14, as described above. The rapid heating may be performed using any suitable heating equipment capable or high heating rates (e.g., 100° C./s or higher). In one embodiment, the heating rate may be at least 100° C./s, 150° C./s, 200° C./s, or 300° C./s. Non-limiting examples of heating equipment that may be used may include induction heating or laser heating.

During step 44, the region(s) of the component may be heated to a temperature above the $A_{C3}$ temperature of the component. As described above, the $A_{C3}$ temperature may be defined as the temperature at which the transformation to austenite is complete. If the component was quenched to form martensite in step 42 and was not tempered, then the microstructure may change completely from non-tempered martensite to austenite at the $A_{C3}$ temperature. Depending on the particular heat treatment and quench in step 42, the microstructure of the component may also include small amounts of ferrite and/or pearlite. The rapid heating in step 44 may raise the temperature of the targeted regions of the component to above the component's $A_{C3}$ temperature. This rapid heating may occur in a very short time period, for example, in less than 10 seconds. In one embodiment, the heating step may take from 1 to 10 seconds, or any sub-range therein, such as 1 to 8 seconds or 1 to 5 seconds.

As described in further detail below, the $A_{C3}$ temperature may depend on a variety of factors, such as the incoming microstructure (prior to heating), the chemical composition, and the heating rate. Accordingly, the $A_{C3}$ temperature may not be an absolute number, but rather may depend on the component itself and the particular heat treatment being applied. In general, the $A_{C3}$ temperature may typically be above 800° C. for an AHSS or DHSS. However, as described above, these ranges are not intended to be limiting and the chemical composition, microstructure, and/or heating rate may result in an $A_{C3}$ temperature that is outside of these ranges for certain components and heat treatments.

In step 46, the component (or just the heated regions thereof) may be cooled to below the $A_{C1}$ temperature. To cool the component, the rapid heat treatment of step 44 may be stopped or ceased. For example, if the heating is performed by induction heating, the current in the induction heating coil may be stopped. If the heating is performed by laser heating, the laser may be turned off. Accordingly, the heat treatment in step 44 may be abruptly stopped. In one embodiment, the heat treatment in step 44 may have no isothermal holding period. For example, the temperature of the component may be constantly increasing during the rapid heat treatment until the target temperature above the $A_{C3}$ temperature is reached. In another embodiment, there may be a very short isothermal hold during the heat treatment 44, such as for 2 seconds or less or 1 second or less. The hold may occur just prior to cooling the regions of the component to the $A_{C1}$ temperature in step 26.

The cooling to the $A_{C1}$ temperature may be performed using any suitable method. In one embodiment, the component may be cooled by ambient air when the heat source is removed, such that no additional equipment is necessary. This may provide a relatively slow cooling rate such formation of hard phases like martensite and bainite are not formed during the cooling. Other cooling approaches may also be used, such as moving air (e.g., using fans) or liquid cooling (e.g., water, oil, etc.).

In step 48, once the regions of the component being heat treated have been cooled to below the $A_{C1}$ temperature, an isothermal hold be performed at a temperature below the $A_{C1}$ temperature. The hold may be achieved using the same heating source as in step 44, such as induction heating or laser heating. However, it may also be possible to use a different heat source than was used for the initial rapid heating. By holding the temperature at a temperature below the $A_{C1}$ temperature, the transition to ferrite may begin and continue during the hold. By holding at an elevated temperature that is still below the $A_{C1}$ temperature, the conversion to ferrite may occur more quickly than if cooling progressed to near ambient temperature. Accordingly, more ferrite may be formed in the target regions in the finished product.

In one embodiment, the isothermal hold may include holding the temperature of the region(s) at a constant or substantially constant temperature (e.g., ±5° C.). The ability to hold the regions at a constant temperature may depend on the equipment used, such as the heat source. In another embodiment, the isothermal hold may include holding the region(s) of the component within a certain temperature window. For example, the window may be up to 5° C., 10° C., 15° C., 20° C., or 30° C. The time of the isothermal hold may be relatively short, for example, less than 60 seconds, less than 30 seconds, or less than 20 seconds. In one embodiment, the hold may be for 1 to 60 seconds, or any sub-range therein, such as 1 to 45 seconds, 1 to 30 seconds, 5 to 30 seconds, 5 to 20 seconds, 10 to 30 seconds, 10 to 20 seconds, or about 15 seconds (e.g., ±5 seconds).

The time and/or temperature of the isothermal hold may depend on multiple factors. The factors may include those described above that affect the $A_{C1}$ temperature and $A_{C3}$ temperature—initial microstructure, chemical composition, and heating rate. In addition, the temperature to which the regions were initially heated in step 44 may affect the time/temperature of the isothermal hold, as well as the temperature of the temperature of the hot stamping procedure in step 42. In general, the isothermal temperature may be below, but close to the $A_{C1}$ temperature. In one embodiment, the isothermal hold temperature may be within 30% of the $A_{C1}$ temperature, for example, within 20% or 10% of the $A_{C1}$ temperature. For example, if the $A_{C1}$ temperature was 700° C., the isothermal temperature may be 560° C. or higher if within 20%, and 630° C. or higher if within 10%. In these examples, the upper bound would be below 700° C. (the $A_{C1}$ temperature). For a constant or substantially constant isothermal hold, the temperature of the hold may be within the above ranges. For an isothermal hold having a temperature window, the entire window may be within the above ranges or the center point of the window may be within the above ranges.

In step 50, the component (or regions being heat treated) may be cooled after the isothermal hold. In one embodiment, the component may be cooled by ambient air when the heat source is removed, such that no additional equipment is necessary. This may provide a relatively slow cooling rate such that a mixture of ferrite and pearlite are formed in the regions of the component that were heated. Other cooling approaches may also be used, such as moving air (e.g., using fans) or liquid cooling (e.g., water, oil, etc.). However, the cooling rate may generally be relatively low such that the resulting hardness of the treated regions is low. In one embodiment, the heat treated regions of the component may have a hardness of 250 HV or less after cooling, for example, 225 HV or less or 200 HV or less.

In step 52, the component may be joined or fastened to another component and/or portions of the component may be trimmed. Fasteners, such as SPR, FEW, FDS, or others may be inserted into the component in the heat treated regions (e.g., joining regions 12) having a reduced hardness compared to the bulk/rest of the component. As used herein, portions of the component that were not heat treated, and therefore remain mostly/completely martensite, may be referred to as the bulk of the component. If the component is to be trimmed, then a trimming operation may be performed along the heat-treated trimming regions (e.g., strips/bands). The trimming may be done using any suitable method, such as cutting or laser trimming.

With reference to FIG. 5, an example temperature plot of a rapid isothermal annealing process is shown. This temperature plot is for a 22MnB5 steel—a high-strength boron steel composition well known to those in the art. This temperature plot may correspond to steps 44-50 of process 40. As shown, the heating of the targeted regions to above the $A_{C3}$ temperature may be rapid, taking less than 15 seconds. The heat treatment raises the temperature of the region above a schematic $A_{C3}$ temperature, shown by a labeled dotted line. Once the target temperature is reached, the heating is stopped and the component was allowed to air cool to below the $A_{C1}$ temperature. Once below the $A_{C1}$ temperature, heat was again applied to the target regions to achieve an isothermal hold at a target temperature. In the example shown, the target temperature was about 650° C. and the temperature was maintained at a constant value. After the designated isothermal hold time of 15 seconds, the heat was removed from the target regions and the regions were allowed to air cool. As shown, this resulted in a relatively slow cooling rate. The component had an initial hardness of 480 HV. After the rapid isothermal process, the locally annealed region had a hardness of 190 HV. This significantly reduced hardness makes the locally annealed regions suitable for joining or trimming operations.

Accordingly, two types of local and rapid annealing processes are shown. The first type is a rapid inter-critical annealing process, in which the local regions are heated to above the $A_{C1}$ temperature but below the $A_{C3}$ temperature. Once a target temperature between these values is reached, the heat may be removed and the regions may be allowed to cool (e.g., by air), for example, down to room temperature. The second type is a rapid isothermal annealing process, in which the local regions are initially heated to above the $A_{C3}$ temperature. The regions are then allowed to cool to below the $A_{C1}$ temperature, after which heat is reapplied to maintain an isothermal hold at a target temperature below the $A_{C1}$ temperature. After the designated hold time, the regions are allowed to cool (e.g., by air), for example, down to room temperature.

In addition to discovering the two types of rapid local annealing processes described above, it has also been discovered that there are numerous factors that may affect the $A_{C1}$ temperature and/or $A_{C3}$ temperature for a given component. In general, it has been found that the temperatures are under-predicted by empirical equations based on the chemical composition of the component (e.g., steel). It has been discovered that the incoming microstructure of the component and the heating rate of the heat treatment also affect the $A_{C1}$ temperature and $A_{C3}$ temperature. New empirical equations have been developed that account for all three of these factors—chemical composition, incoming microstructure, and heating rate. These empirical equations may be used to calculate the $A_{C1}$ temperature and $A_{C3}$ temperature for the rapid local annealing processes described above. The empirical equations were developed based on a study of boron steel, specifically 22MnB5 steel. However, the methodology may be applied to other boron steel compositions or to other AHSS or DHSS compositions.

During heating at high temperature, the incoming steel microstructure and the crystallographic structure changes into single phase austenite. The austenitization mechanism includes three main steps: nucleation, grain growth, and homogenization. The nucleation starts with the eutectoid reaction: ferrite+carbides→austenite, and depends heavily on the incoming microstructure or the parent phase prior heating. Before the nucleation starts, there is an incubation time for the formation of an austenite nucleus. After nucleation, the grain growth of the austenite is controlled by the diffusion of carbon and alloying elements among the carbides, ferrite, and austenite phases. Right after the parent phase is consumed by the eutectoid reaction, the steel microstructure is fully austenite, but the chemical composition inside the austenite grains is not uniform. The homogenization of the austenite is taking place during and after the complete dissolution of the ferrite and residual carbides and it is controlled by diffusion.

The formation of the austenite and the control of this phase transformation process during heating and cooling are important in optimizing the hot stamping process and also in developing the processes for creating local soft zones in hot stamped structural parts (e.g., in joining/trimming regions). The start and completion of the austenitization process, which correspond with the phase transformation temperatures $A_{C1}$ and $A_{C3}$, respectively, are affected by the chemical composition of the material. For close to equilibrium conditions, corresponding to a heating rate below 2° C./min, the phase transformation temperatures $A_{C1}$ and $A_{C3}$, respectively, can be calculated using existing equations developed based on theoretical and experimental studies performed on low carbon steel:

$$A_{C1} = 723 - 10.7(\% \text{ Mn}) + 16.9(\% \text{ Cr}) + 29.1(\% \text{ Si}), [° \text{C.}] \tag{1}$$

$$A_{C3} = 910 - 203(\% \text{ C})^{1/2} - 30(\% \text{ Mn}) + 31.5(\% \text{ Mo}) - 11(\% \text{ Cr}) + 44.7(\% \text{ Si}), [° \text{C.}] \tag{2}$$

It can be observed that the empirical equations (1, 2) take into account the effect of the alloying elements, but do not consider any other factors, such as the effect of the incoming microstructure and/or the heating rate effect on the phase transformation temperatures. The formation and the evolution of the austenite during heating is important in developing the hot stamping and rapid annealing processes; therefore, a detailed understanding of the effect of the heating rate and the incoming microstructure on the austenitization process were investigated in order to properly design and optimize the rapid annealing processes.

To analyze the impact of heating rate and incoming microstructure, a 22MnB5 alloy was used having the following composition:

TABLE 1

| | C | Mn | P | S | Si | Ni | Cr | V | Ti | Al | B | Ca |
|---|---|---|---|---|---|---|---|---|---|---|---|---|
| % | 0.23 | 1.14 | 0.01 | 0.003 | 0.23 | 0.01 | 0.23 | 0.005 | 0.035 | 0.05 | 0.002 | 0.002 |

In general, for the hot stamping process the incoming microstructure of the 22MnB5 steel may include a mixture of equiaxial ferrite and perlite. Based on the prior heat treatment of the 22MnB5 steel, the morphology of perlite could be lamellar perlite or spheroidal perlite. In case of structural parts with tailored properties produced after the hot stamping process, the incoming microstructure can be fully or partial martensitic. For heating structural parts with tailored properties after the hot stamping process, the heating rate is generally limited by the equipment and processing capabilities.

In this investigation, dilatometry experiments were conducted to determine the start of phase transformation temperature $A_{C1}$ and completion of the austenitization temperature $A_{C3}$ of 22MnB5 sheet steel under different heating rates and having different incoming microstructure. Dilatometry samples having dimensions of 1.4 mm×1.4 mm×10 mm were machined for use in the investigation. During the dilatometry experiments, the samples were heated up to 1,000° C. with different heating rates, held for 30 seconds, and then quenched to room temperature with a 50° C./s cooling rate. The sample temperature was measured by a K type thermocouple that was welded to its surface.

The heating rates selected for this study were: 10° C./s, 100° C./s, 200° C./s, and 300° C./s. The 10° C./s heating rate is generally typical for the hot stamping process, while the heating rates above 100° C./s may be suitable to produce structural parts with tailored properties after the hot stamping process using induction heating in an industrial setup. Three replicate dilatometry experiments were performed for each experimental condition. The dilatometer used in this study is capable of monitoring in real-time the microstructural changes through the heating process by measuring the dimensional change (ΔL) of the specimen with a resolution of 0.05 μm/0.05° C. and a heating speed up to 2,500° C./s.

When the temperature of the steel specimen increases from ambient temperature to $A_{C1}$ temperature, the increase of dimensional change ΔL with the temperature is linear. The slope (α) of the change represents the thermal expansion coefficient of the incoming microstructure. At the temperature right below the $A_{C1}$ temperature, the austenite nuclei are starting to form and grow. When the temperature of the steel specimen increases above the $A_{C1}$ temperature, then the dimensional change ΔL decreases with the temperature which corresponds with the eutectoid reaction: ferrite+ carbides→austenite. This dimensional change is caused due to the change of the crystallographic lattice from body cubic centered (bcc) to face cubic centered (fcc).

After the nucleation step, the phase transformation is fast at the beginning and with the accumulation of austenite the austenitization process slows down. At a temperature close to the $A_{C3}$ temperature, the ferrite is 100% transformed into austenite, the carbides are dissolved, and the homogenization of the austenite is taking place. When the temperature of the steel specimen increases above $A_{C3}$, the dimensional change ΔL with the temperature becomes again linear and the slope (β) represents the thermal expansion coefficient of the austenite. For this particular chemical composition of 22MnB5 steel, the thermal expansion coefficients α and β were calculated from the dilatometry curves and the values are: $\alpha=15.101\times10^{-6}$/C for the mixture of ferrite and cementite and $\beta=20.721\times10^{6}$/C for the austenite phase.

Two types of incoming microstructures of the 22MnB5 sheet steel were investigated. The first was ferrite and spheroidal carbides. The spheroidal carbides were predominantly uniformly distributed at the grain boundaries and inside of the ferrite grains. The other incoming microstructure was non-tempered martensite resulting from a typical hot stamping process by heating at 930° C. for 5 minutes and die cooling. Using the chemical composition of the 22MnB5 steel listed in Table 1 and the empirical equations (1, 2) for close to equilibrium heating conditions or heating rates below 2° C./min, the phase transformation temperatures $A_{C1}$ and $A_{C3}$ were calculated and the values are $A_{C1}=722°$ C. and $A_{C3}=825°$ C.

Examples of the dilatometry curves for different heating rates of the 22MnB5 sheet steel with different incoming microstructures are shown in FIGS. 6A-6D, one microstructure was ferrite+spheroidal carbides and the other was non-tempered martensite. Measurements of the phase transformation temperatures $A_{C1}$ and $A_{C3}$, respectively, from 3 replicate dilatometry experiments were averaged and the results were used to quantify the effect of the heating rate and of the incoming microstructure on the start and completion of the austenitization process. The effect was quantified by the ΔT, which represents the difference between the experimental measurements for the $A_{C1}$ and $A_{C3}$ temperatures and the predicted $A_{C1}$ and $A_{C3}$ temperatures calculated using the empirical equations (1, 2). The results for ΔT as a function of the heating rate and for different incoming microstructure are plotted in FIG. 7.

A first observation is that there is a significant difference between the $A_{C1}$ and $A_{C3}$ temperatures calculated using the empirical equation (1, 2) and the measurements from the dilatometry experiments. The empirical equations underestimate the start and completion of the austenitization process $A_{C1}$ and $A_{C3}$ transformation temperatures and the under-estimation is higher for $A_{C1}$ than for the $A_{C3}$ (e.g., larger ΔT for $A_{C1}$ than $A_{C3}$).

For the heating rates of 10° C./s, which are the typical heating rates produced in the industrial furnaces for hot stamping, the effect of the incoming microstructure on the phase transformation temperatures is relatively low, particularly for the $A_{C3}$ temperature. The results from FIG. 7 indicate that the effect of the incoming microstructure on the phase transformation temperatures $A_{C1}$ and $A_{C3}$ becomes more significant when the heating rates are above 100° C./s. The dilatometry curves from FIGS. 6A-6D show that in case of heating rates above 10° C./s, the beginning and completion of the austenitization process, or the phase transformation temperatures $A_{C1}$ and $A_{C3}$, are lower for the non-tempered martensite then for the mixture of ferrite+ spheroidal carbides. Without being held to any particular theory, it is believed that the explanation of this phenomenon is due to the differences in the nucleation of the austenite formed from the ferrite+cementite and the non-tempered martensite. During heating of the non-tempered martensite microstructure, the formation of the transitional carbides are taking place. These transitional carbides (nano-size; higher density and better uniform distribution in the ferrite matrix then the spheroidal carbides) act as nuclei for austenite formation. Therefore, the nucleation of austenite from non-tempered martensite occurs faster and starts at lower temperature then the austenite nucleated from ferrite and spheroidal carbides.

Figure 7:
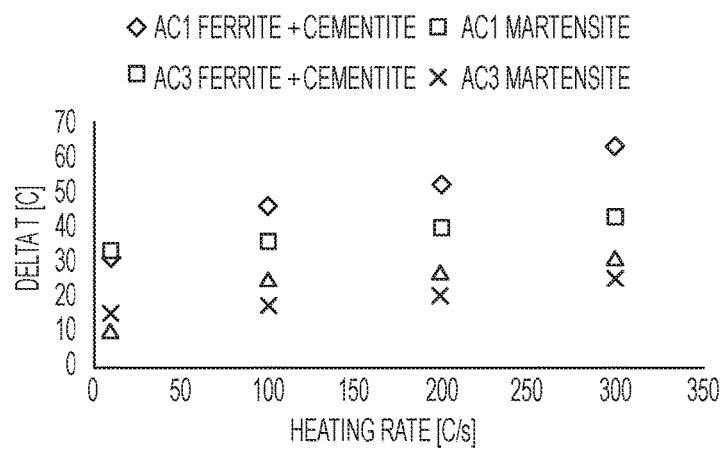
FIG. 7 is a plot of $\Delta T$ for $A_{C1}$ and $A_{C3}$ temperatures as a function of the heating rate and incoming microstructure.

As the heating rate increases, the transformation temperatures $A_{C1}$ and $A_{C3}$ also increase. A higher heating rate leads to a higher starting temperature of the austenite formation. Without being held to any particular theory, it is believed that the explanation of this phenomenon is related to the incubation time of the austenite nuclei. The effect of the incoming microstructure on the completion of the austenitization temperature $A_{C3}$ is smaller than for the $A_{C1}$ temperature. FIG. 7 shows different slopes for the ferrite+cementite than for the non-tempered martensite. This means that the effect of heating rate on the beginning of austenite formation $A_{C1}$ is more significant for the ferrite+spheroidal carbides then for the un-tempered martensite.

The experimental data from this investigation was used to develop modified empirical equations for prediction of the phase transformation temperatures $A_{C1}$ and $A_{C3}$ as a function of the chemical composition, the incoming microstructure, and the heating rates. The empirical equations were determined by a linear fitting method. The modified empirical equations to predict the phase transformation temperatures $A_{C1}$ and $A_{C3}$ as a function of the chemical composition and the heating rate for the ferrite+spheroidal carbides incoming microstructure are listed below, where, $H_{R(F+C)}$ represents the heating rate of the ferrite+spheroidal carbides:

$$A_{C1}=755-10.7(\% \text{ Mn})+16.9(\% \text{ Cr})+29.1(\% \text{ Si})+0.105H_{R(F+C)}, [^\circ \text{C.}] \quad (3)$$

$$A_{C3}=923-203(\% \text{ C})^{1/2}-30(\% \text{ Mn})+31.5(\% \text{ Mo})-11(\% \text{ Cr})+44.7(\% \text{ Si})+0.066H_{R(F+C)}, [^\circ \text{C.}] \quad (4)$$

For the incoming microstructure including non-tempered martensite, the modified empirical equations to predict the phase transformation temperatures $A_{C1}$ and $A_{C3}$ as a function of the chemical composition and the heating rate are listed below, where, $H_{R(mart)}$ represents the heating rate of the non-tempered martensite:

$$A_{C1}=755-10.7(\% \text{ Mn})+16.9(\% \text{ Cr})+29.1(\% \text{ Si})+0.035H_{R(mart)}, [^\circ \text{C.}] \quad (5)$$

$$A_{C3}=923-203(\% \text{ C})^{1/2}-30(\% \text{ Mn})+31.5(\% \text{ Mo})-11(\% \text{ Cr})+44.7(\% \text{ Si})+0.034H_{R(mart)}, [^\circ \text{C.}] \quad (6)$$

The data for the beginning of austenite formation temperature $A_{C1}$ presented in FIG. 7 was verified using dilatometry experiments. For this purpose, two sets of dilatometry experiments were conducted by heating to right below and right above the phase transformation temperature $A_{C1}$ predicted by the modified empirical equation (5). The incoming microstructure for the steel specimen was non-tempered martensite and the heating rate was 100° C./s. Based on the chemical composition of the 22MnB5 steel listed in Table 1 and using the modified empirical equation (5) for the non-tempered martensite heated with 100° C./s, the phase transformation temperature $A_{C1}$ was calculated to be 756° C. The first set of experiments included heating the specimen to 750° C., holding for 60 seconds, and then quenching at 50° C./s to room temperature. The second set of experiments included heating the specimen to 760° C., holding for 60 seconds, and then quenching at 50° C./s to room temperature.

Figure 8A:
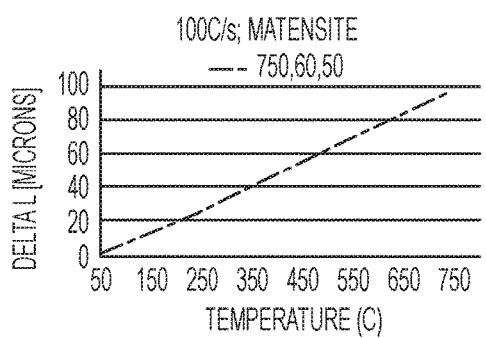
FIG. 8A shows a dilatometry curve for a specimen heated to 750° C. at a heating rate of 100° C./s and showing no sign of a phase change.
Figure 8B:
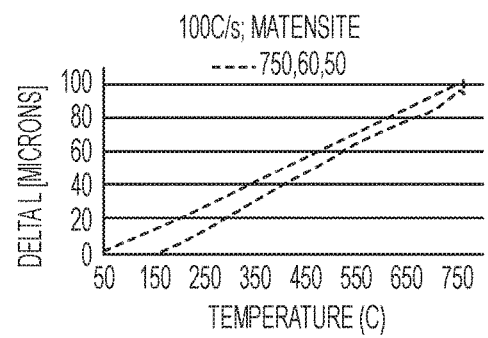
FIG. 8B shows a dilatometry curve for a specimen heated to 760° C. at a heating rate of 100° C./s and showing signs of a phase change.

Examples of the dilatometry experiments performed for verification of the beginning of austenite formation temperature, $A_{C1}$, are shown in FIGS. 8A and 8B. It can be observed from the left diagram in FIG. 8A that when heating to 750° C., the dilatometry curve which monitors the microstructural changes in the steel sample does not show any occurrence of phase transformation during heating or cooling. This confirms that the steel specimen did not reach the phase transformation temperature $A_{C1}$ during the heating at 100° C./s to 750° C. and holding for 60 seconds.

When heating at 100° C./s to 760° C. and holding for 60 seconds, as shown in the right diagram in FIG. 8B, the dilatometry curve reveals the occurrence of a phase transformation during heating and also during quenching at 50° C./s. Small amounts of fresh austenite started to form during heating and holding at 760° C., which means the steel specimen had reached the phase transformation temperature $A_{C1}$. Moreover, during the quenching at 50° C./s, phase transformations were taking place around 700° C. and 200° C., respectively. The results from these experiments are in a good agreement with the data from this investigation and with the modified empirical equations (5, 6) for prediction of phase transformation temperatures $A_{C1}$ and $A_{C3}$.

Accordingly, the investigation into the $A_{C1}$ and $A_{C3}$ temperatures and their dependence on incoming microstructure, heating rate, and composition revealed numerous observations. The existing empirical equations underestimate the start and completion of the austenitization process (e.g., the $A_{C1}$ and $A_{C3}$ transformation temperatures). The effect of the incoming microstructure on the $A_{C1}$ and $A_{C3}$ temperatures is less severe for heating rates used in typical hot stamping process. However, the effect becomes more significant for heating rates above 100° C./s. Non-tempered martensite exhibits lower transformation temperatures than the ferrite+spheroidal cementite microstructure. Increasing the heating rates results in the increase of the phase transformation temperatures $A_{C1}$ and $A_{C3}$. The effect of the heating rate is more significant for the start of the phase transformation ($A_{C1}$) than for the completion of the phase transformation ($A_{C3}$).

The effect of the heating rate on the beginning of austenite formation temperature ($A_{C1}$) and the completion of the austenite formation temperature ($A_{C3}$) is more significant for the ferrite+spheroidal cementite than for the non-tempered martensite. Modified empirical equations for phase transformation temperatures $A_{C1}$ and $A_{C3}$ were developed using the linear fit method and account for the incoming microstructure, the heating rate, and the chemical composition. As described above, these empirical equations, and the other observations made during the investigation, may be used in conjunction with the rapid localized annealing processes disclosed above. For example, the modified empirical equations may be used to identify the $A_{C1}$ and $A_{C3}$ temperatures of a given component. For the rapid intercritical annealing process, this may allow for a temperature between $A_{C1}$ and $A_{C3}$ to be established. For the rapid isothermal annealing process, this may allow for an initial temperature above $A_{C3}$ to be established and then an isothermal hold temperature below $A_{C1}$ to be established.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method, comprising:
   heat treating one or more local regions of a steel component having a hardness of at least 450 HV to soften the one or more local regions;
   the heat treating including:
   heating only the one or more local regions to a first target temperature above an $Ac_3$ temperature of the component;
   cooling the one or more local regions to below an $Ac_1$ temperature of the component;
   isothermally holding the one or more local regions within a window around a second target temperature below the $Ac_1$ temperature;
   and cooling the one or more local regions after the isothermally holding such that the one or more regions have a hardness of at most 250 HV.

2. The method of claim 1, wherein the second target temperature is within 20% of the $Ac_1$ temperature.

3. The method of claim 1, wherein the isothermally holding is for up to 20 seconds.

4. The method of claim 1, wherein the window being up to 10° C.

5. The method of claim 1, wherein heating only the one or more local regions to the first target temperature includes continuously increasing a temperature of the one or more local regions until they reach the first target temperature; and once the one or more local regions reach the first target temperature, heating is discontinued and the cooling to below the $Ac_1$ temperature is started.

6. The method of claim 1, wherein the steel component is a boron steel component including non-tempered martensite; and
   the $A_{C1}$ and $A_{C3}$ temperatures are determined according to the following equations:

$$A_{C1} = 755 - 10.7(\% \text{ Mn}) + 16.9(\% \text{ Cr}) + 29.1(\% \text{ Si}) + 0.035 H_{R(mart)};$$

$$A_{C3} = 923 - 203(\% \text{ C})^{1/2} - 30(\% \text{ Mn}) + 31.5(\% \text{ Mo}) - 11(\% \text{ Cr}) + 44.7(\% \text{ Si}) + 0.034 H_{R(mart)};$$

wherein $H_{R(mart)}$ represents a heating rate of the non-tempered martensite.

7. The method of claim 1, further comprising inserting a mechanical fastener into the one or more local regions to join the component to a second component; or trimming the component in the one or more local regions.

* * * * *